Nov. 27, 1951     H. L. BERGER     2,576,209
BIRD SCARING DEVICE
Filed June 2, 1948
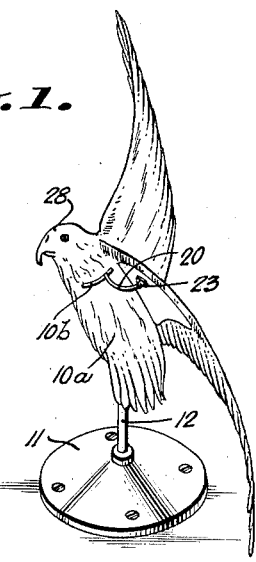
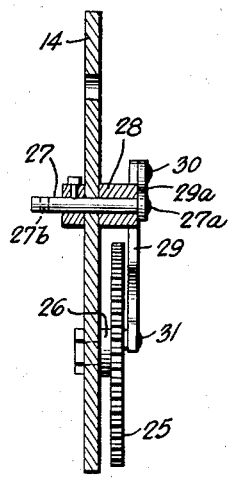
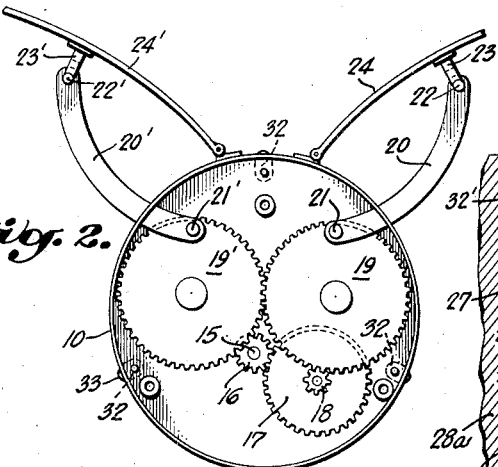
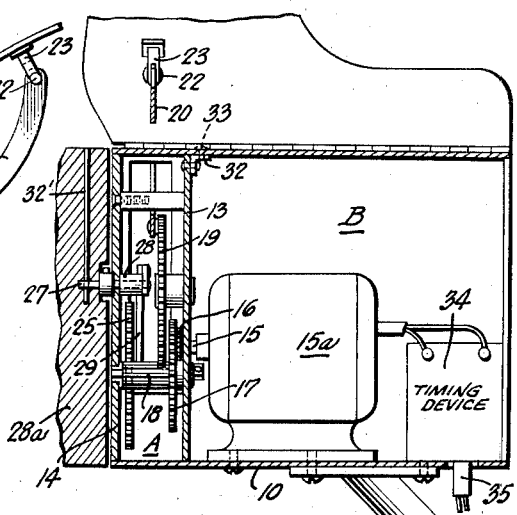
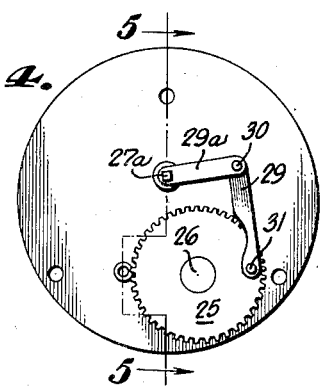
Inventor
HAYS L. BERGER
ATTORNEY Patented Nov. 27, 1951

2,576,209

UNITED STATES PATENT OFFICE 2,576,209

BIRD SCARING DEVICE

Hays L. Berger, Washington, D. C., assignor to Veleita M. Berger, Washington, D. C.

Application June 2, 1948, Serial No. 30,560

2 Claims. (Cl. 46—124)

This invention relates to a novel device for eliminating bird nuisance. The concentrated droppings of large flocks or flights of birds in various parts of cities has become a widespread and onerous nuisance and various means have been resorted to in an effort to eliminate this source of civic annoyance, but to date no practical, efficient and permanently effective device or scheme has been developed or evolved. The present invention has proved extremely effective where is has been used and it is designed to be simple and ecomical to make and install wherever the nuisance is present.

The invention embodies the principle of simulating a natural enemy of the bird and simulating in a life-like manner a characteristic movement thereof so that the annoying flocks or individual birds will not alight anywhere in the vicinity of the presence of such enemy which may be a bird of prey such, for example, as a hawk.

One object of the invention is the provision of such a bird in which the wings are flapped and the head is turned periodically as optionally determined according to need.

Another object of the invention is the provision of a portable mechanical device of this character which may be operated electrically from the power source where it is to be located in a simple manner by plugging into an ordinary electric outlet.

A further object is to provide a device of this character which is completely self contained, with its parts protected by a housing so that it may operate effectively while exposed to the elements. Further objects and advantages will be apparent as the description proceeds.

One practical embodiment of the invention is illustrated in the accompanying drawings in which like reference characters refer to like parts.

In the drawings,

Figure 1 is a perspective view of the device embodied in a bird of prey, such as a hawk, with its wings spread, supported upon a mounting pedestal.

Figure 2 is a plan view of a portion of the wings and the levers and gear train by means of which the wings are flapped.

Figure 3 is a vertical, central, sectional view through the gear housing and body of the bird, with parts shown in elevation.

Figure 4 is a plan view of the mechanism by means of which the head of the bird is caused to rotate.

Figure 5 is a sectional view, with parts in elevation, taken along line 5—5 of Figure 4.

The invention embodies a housing 10 which may be cylindrical in shape and which is supported on a pedestal having a base 11 and a vertical standard 12. The housing is encased within a figure 10a which resembles or simulates a bird, such as a bird of prey, and the figure may be cast, molded, pressed or otherwise formed of any suitable material and suitably painted, tinted or otherwise decorated to resemble the particular bird simulated. The housing is divided by a partition 13 into two compartments A and B. The compartment A houses the operating mechanism for the bird and the compartment B houses the driving motor and timing mechanism. A cover plate 14 closes the open end of the housing. The shaft 15 of the motor 15a projects through the partition and carries a pinion gear 16 at its free end. An idler gear 17 is supported between the partition and cover and has a reduced integral pinion 18. The pinion 18 drives a large gear 19 which is suitably supported on the partition 13 and this large gear carries a curved lever 20 freely pivoted thereto at pivot 21 which is arranged eccentrically with respect to the gear axis. The other end of said lever is pivoted at 22 to a short, bifurcated bracket 23 which is fastened to the underside of the wing 24 of the simulated bird. Meshing with gear 19 is a similar gear 19' similarly mounted, and driving a lever 20' which is arranged to drive the other wing 24' by means of duplicate parts consisting of lever 20', pivots 21', 22' and bracket 23', so that the wings 24, 24' are simultaneously flapped when the motor is energized. The levers 20, 20' project through slots 10b formed on opposite sides of the cylinder 10.

As best shown in Figure 5, the cover plate 14 for the housing carries a large gear 25 rotating on axis 26. A shaft 27 is also mounted on this cover plate to rotate in bearing 28. The gear 25 is arranged to drive this shaft by means of a pair of levers 29, 29a pivotally linked together at 30. The other end of lever 29 is pivotally secured to a stud 31 on the gear 25 eccentrically mounted with respect to the gear axis 26, and the other end of lever 29a is fixed to a squared end 27a of the shaft 27. The head 28 of the bird includes a base block 28a which is mounted over shaft 27 and is secured thereto for rotating movement therewith by means of a pin 32' which is driven through the block and passes through a slot 27b formed in shaft 27. By means of this arrangement the head of the bird is rotated one quarter turn when the mechanism is actuated.

It will be obvious from the foregoing that energization of the motor 15a will cause pinion 16 to rotate driving gear 17 and pinion 18, which in turn drive gears 19, 19' to actuate levers 20, 20' and flap wings 24, 24'. At the same time pinion 18 will drive gear 25 to actuate links 29, 29a to rotate the shaft 27 and head of bird 28 one quarter turn.

A timing device 34 is enclosed within the housing B and is interposed in the circuit between the motor 15a and the power source (not shown) and is tied to the power source lead 35 which may be connected to the power source by means of a conventional attachment plug (not shown). The timing device may be set to energize the motor at optionally selected intervals to cause the motor to actuate the gear train and flap the wings and turn the head of the bird. A few seconds flapping of the wings and a quarter turn of the head of the bird at optionally selected intervals according to the exigencies of the situation have been found to be very effective in eliminating the bird roosting and the concentrated droppings which have become such a great constant annoyance and civic nuisance.

In assembling the device, the mechanical drive above described is assembled between the partition 13 and plate 14 and then the entire unit is inserted into the cylinder 10 and fixed therein by means of angle brackets 32 which are held in place by set screws 33. The partition 13 has an opening in its face large enough to accommodate the pinion 16 on the motor shaft.

In operation, the device is placed on a ledge, sill, roof or other support in the vicinity where birds assemble and the weight of the pedestal is ordinarily sufficient to keep the device in position, but it may be fastened to its support by bolts, screws, clamps or other available devices. It may also be placed in trees by interchanging the base with one suitable for such use. It has been found that a few seconds operation out of every minute for a few hours at the time the birds begin to roost is effective to drive them away completely for several days. Repeated operation has been found effective to keep the birds away permanently. The birds will avoid any place where their natural enemy is found and the simulated bird is just as effective.

In addition to its primary object of eliminating bird nuisance, the device may be used as a decoy for hunters by simulating a duck, for example, instead of a bird of prey, in which event it could be powered by a battery or a spring motor.

The construction herein shown and described is for illustrative purposes only and changes in construction and design may be made without departing from the spirit of the invention as defined by the appended claims.

I claim:

1. A device for eliminating bird nuisance with a winged figure simulating the natural enemy of the bird, and simulating the natural movements of said enemy by flapping its wings and turning its head, comprising a housing concealed within the body of the figure, the head of the figure being rotatively supported on said housing and the wings being pivotally attached to said housing, a time controlled motor for operating said head and wings of said figure at optionally selected intervals, and actuating mechanism for operating said head and wings of the figure removably secured in said housing adjacent said motor, said mechanism including a pinion driven by said motor, said pinion engaging an idler gear of said mechanism and driving the same, a pair of wing actuating gears driven by said idler, each of said last mentioned gears having a lever pivoted thereto eccentric to its axis of rotation, each said lever projecting through said housing and pivotally engaging a respective wing; a shaft projecting through said housing and rotatably supporting said head, a reduced pinion on said idler, a driving gear for said head driven by said pinion, a pair of pivotally connected links connecting said shaft and driving gear to rotate the shaft, the link connected to the driving gear being pivoted thereto at a point eccentric to the gear axis, whereby the head is rotated substantially one quarter turn when the mechanism is actuated.

2. A device for eliminating bird nuisance with a winged figure simulating the natural enemy of the bird, and simulating the natural movements of said enemy by flapping its wings and turning its head, comprising the figure of a simulated bird, a removable housing within said figure, and a mechanism for driving said figure removably supported within said housing, the head of said figure being rotatively supported on said housing, and the wings being pivotally attached to said housing, a time controlled motor for operating said head and wings of said figure at optionally selected intervals, said mechanism including a pinion on said motor, an idler gear in said mechanism, said motor pinion driving said idler; a pair of wing actuating gears driven by said idler, each of said last mentioned gears having a lever pivoted thereto eccentric to its axis of rotation, each said lever projecting through said housing and figure and pivotally engaging a respective wing; a shaft projecting through said housing and rotatably supporting said head; a reduced pinion on said idler, a driving gear for said head driven by said reduced pinion, a pair of pivotally connected links connecting said shaft and driving gear to rotate the shaft, the link connected to the driving gear being pivoted thereto at a point eccentric to the gear axis, whereby the head of the figure is partially rotated when the mechanism is actuated.

HAYS L. BERGER.

REFERENCES CITED

The following references are of record in the file of this patent:

UNITED STATES PATENTS

| Number | Name | Date |
| --- | --- | --- |
| 525,716 | McElroy | Sept. 11, 1894 |
| 1,275,327 | Uttz | Aug. 13, 1918 |
| 1,577,903 | Gover et al. | Mar. 23, 1926 |

FOREIGN PATENTS

| Number | Country | Date |
| --- | --- | --- |
| 24,160 | Austria | May 10, 1906 |